April 13, 1965    R. E. CLAFLIN, JR    3,178,696
POSITION TRANSDUCERS
Filed Dec. 21, 1962    6 Sheets-Sheet 1

*INVENTOR.*
RAYMOND E. CLAFLIN JR
BY
Blair E. Buckles
ATTORNEYS

April 13, 1965   R. E. CLAFLIN, JR   3,178,696
POSITION TRANSDUCERS

Filed Dec. 21, 1962   6 Sheets-Sheet 2

INVENTOR.
RAYMOND E. CLAFIN JR.
BY
*Blair & Buckles*
ATTORNEYS

April 13, 1965  R. E. CLAFLIN, JR  3,178,696
POSITION TRANSDUCERS
Filed Dec. 21, 1962  6 Sheets-Sheet 4

INVENTOR.
RAYMOND E. CLAFLIN JR.
BY
*Blair & Buckles*
ATTORNEYS

April 13, 1965     R. E. CLAFLIN, JR     3,178,696
POSITION TRANSDUCERS

Filed Dec. 21, 1962     6 Sheets-Sheet 6

FIG. 11

INVENTOR.
RAYMOND E. CLAFLIN JR.
BY Blair & Buckles
ATTORNEYS

United States Patent Office 3,178,696
Patented Apr. 13, 1965

3,178,696
POSITION TRANSDUCERS
Raymond E. Claflin, Jr., Bedford, Mass. (% Claflin Associates, 246 Walnut St., Newton, Mass.)
Filed Dec. 21, 1962, Ser. No. 246,561
29 Claims. (Cl. 340—199)

This invention relates to the art of position measurement. More particularly, it relates to an improved position measuring instrument of the type in which the distribution, between two secondary windings, of flux developed in a primary winding is a function of the position of a movable element or armature. In accordance with my invention, the relative magnetic path lengths in a magnetic core extending through the secondary windings vary according to the position of the armature, thereby varying the voltages induced in the secondary windings.

Magnetic position transducers may be classified generally in two categories. The type most commonly used is a variable reluctance device in which movement of an armature varies the dimensions of one or more air gaps. This changes the reluctances of flux paths extending through the air gaps and thereby varies voltages induced in windings through which the flux paths extend. In a variable turns ratio transducer, the armature moves along a distributed secondary winding. Thus, flux passing through the armature links a number of turns in the secondary winding, which depends on armature position. The voltage induced in this winding is therefore also a function of armature position. In either type of transducer, the armature may be arranged for either rotational or translational movement.

The magnitude of the output voltage of the variable turns ratio transducer is limited by the fineness of the pitch of the secondary winding. Furthermore, accuracy is limited by the accuracy of the pitch, and this is difficult to maintain in a long winding, i.e., in an instrument capable of measuring over a wide range of positions. In the variable air gap transducer designed for a wide range, the armatures are given shapes such as wedges which are difficult to machine accurately to meet the required tolerances. Furthermore, in a transducer used for the measurement of translational movement, the range is limited as a practical matter by the size of an armature of this type.

Accordingly, it is a principal object of my invention to provide an improved magnetic position measuring instrument capable of accurate operation over a wide range of positions.

Another object of my invention is to provide an instrument of the above type having an output voltage which is a substantially linear function of variations in the measured position.

A further object of my invention is to provide an instrument of the above type adapted for measurement of angle of rotation.

Another object is to provide an instrument of the above type adapted for measurement of linear translational movement.

A still further object of my invention is to provide an improved transducer for incorporation in an instrument having the above characteristics.

Another object of my invention is to provide a transducer of the above type which may be constructed without moving coils and does not require the use of rubbing or wiping contacts such as slip rings and brushes.

Yet another object of my invention is to provide a transducer of the above type which may be fabricated at lower cost than prior transducers having comparable accuracy.

Other objects of my invention will in part be obvious and will in part appear hereinafter.

The invention accordingly comprises the features of construction, combinations of elements and arrangements of parts which will be exemplified in the construction hereinafter set forth and the scope of the invention will be indicated in the claims.

In general, a transducer incorporating the features of my invention includes a core of magnetic material arranged to define a loop. A pair of magnetic field sensors, spaced from each other, are formed on the core, and an armature of magnetic material extends across the loop with its ends thereby being disposed between the secondary windings. A primary winding formed around the armature is energized from an alternating current source. The flux developed by current through the primary winding enters the core from one end of the armature and divides into two paths, extending in opposite directions around the core and passing through the two field sensors. The two paths join once again to pass from the core to the armature through the other end thereof.

The armature is mounted so that at least one end thereof is movable along the core between the two sensors. Movement results in a change in the relative lengths of the flux paths extending through the sensors. Thus, the relative reluctances of these paths are changed, thereby varying the flux linking each of the sensors. The voltage induced in each of the sensors is consequently a function of the position of the armature. More specifically, the difference between the absolute values of the output voltages of the sensors is a linear function of armature displacement over a substantially wide range.

As shown below, instruments of the above type may be adapted in various ways for measurement of either linear or rotational movement. Accurate measurements are practical over a wide range, since machining operations are of a simpler type than required in prior wide range variable reluctance instruments. For example, in an uncompensated instrument of the above type in which the movable member undergoes translational motion, it is only required that the surfaces engaged by it be kept parallel over the range of travel.

Moreover, in applications requiring the utmost linearity, a transducer of the above type may be incorporated in a circuit providing an almost exactly linear output over an extending range of measurement. Among other things, the circut compensates for lack of parallelism of the surfaces engaged by the movable member. Thus, the tolerances associated with these surfaces may be relaxed, thereby eliminating much of the high precision machine work otherwise required in fabrication of the transducer.

For a fuller understanding of the nature and objects of the invention, reference should be had to the following detailed description taken in connection with the accompanying drawings, in which.

Figure 1:
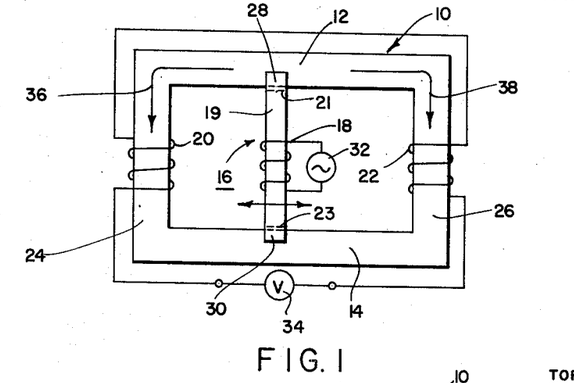
FIG. 1 is a simplified plan view of a linear transducer embodying the principles of my invention.

As seen in FIG. 1, a transducer embodying the principles of my invention includes a continuous core 10, having sections 12 and 14, which serve as ways for an armature generally indicated at 16. An input coil 18 is wound around a core 19 of the armature 16. Magnetic field sensors in the form of output coils 20 and 22 are wound around sections 24 and 26 of the core 10. The armature core 19 is supported by saddle members 28 and 30 which slidably straddle the sections 12 and 14. The ends 21 and 23 of the core 19 are preferably closely adjacent to the sections 12 and 14.

Still referring to FIG. 1, the coil 18 is energized by an alternating current source 32, and the coils 20 and 22 are connected in series to a voltmeter 34. The cores 10 and 19 are of "soft" magnetic material, and therefore, the core 10 provides low reluctance flux paths 36 and 38 linking the input coil 18 with the output coils 20 and 22. The output coils are connected so that the voltmeter 34 indicates the difference between the voltages induced in them by flux from the coil 18.

The coils 20 and 22 have the same number of turns, and, as is well known, the voltage induced in each coil is proportional to the flux linking it. The flux paths 36 and 38 are in parallel, and, therefore, the division of flux between the two paths is inversely related to their reluctances. The reluctances, in turn, are proportional to the lengths of the paths 36 and 38, and the lengths depend directly on the position of the armature 16.

Thus, when the armature is centered in the instrument, i.e., the length of the paths 36 and 38 are equal, the fluxes are equal, as are the voltages induced in the coils 20 and 22. Accordingly, the voltmeter 34 provides zero indication. If the armature is displaced to the left of the zero position, as shown in FIG. 1, more flux will pass along the path 36 to the coil 20 than along the path 38 to the coil 22. Accordingly, the voltmeter 34 will indicate a difference in the induced voltages. Over a wide range, the difference in the flux linking the coils 20 and 22 is essentially proportional to the displacement of the armature 16 from its center or null position, and, therefore, the voltage difference registered by the voltmeter 34 is also directly proportional to displacement.

However, as the armature 16 approaches the limit of its travel, the relationship between output voltage and armature displacement becomes predominantly non-linear. This is due to the fact that, as the limit of travel is reached, the combined reluctance of the paths 36 and 38 diminishes rapidly. Accordingly, a greater total flux is developed by the current through the coil 18. This provides an increase in the flux through the coil 20 in addition to that resulting from the difference in the reluctances of the two flux paths. Therefore, the difference between the induced voltages is greater than it would be if there were a linear voltage-displacement function.

The linearity of the output voltage over a wide range is due to the substantially greater reluctance exhibited by the gaps between the core 19 and the core 10 than the internal reluctance in the core 10. In other words, over the linear range of the instrument, the total flux is essentially a function of this reluctance alone, and, therefore, the surfaces forming the air gaps should be machined accurately so as to maintain the gap reluctance constant during displacement of the armature 16.

Alternatively, one might taper the gaps, either by varying the armature-core 10 spacing or by tapering the width (the dimension perpendicular to the drawing) of the section 12 or 14 of the core 10, so as to maintain the total flux constant over the entire range of travel of the armature 16. This will, of course, provide an output voltage that is exactly a linear function of armature displacement over the full travel of the armature. However, I prefer to use the electrical compensating systems described below for maintaining linearity.

When the armature 16 is moved to the right (FIG. 1) of the center position, there will again be a difference in the induced voltages in the output coils. However, in this case, the voltage induced in the coil 22 will be greater than that of the coil 20. It will be observed that the phase of the difference voltage will be exactly opposite from the phase obtained when the armature is to the left of the zero position. Therefore, I prefer to use a zero-centered phase-sensitive voltmeter for the meter 34. The meter then has an input connected to the source 32 for comparison of phase with the difference voltage from the coils 20 and 22. It will thus indicate direction of displacement, as well as distance from the zero position.

Figures 2, 3:
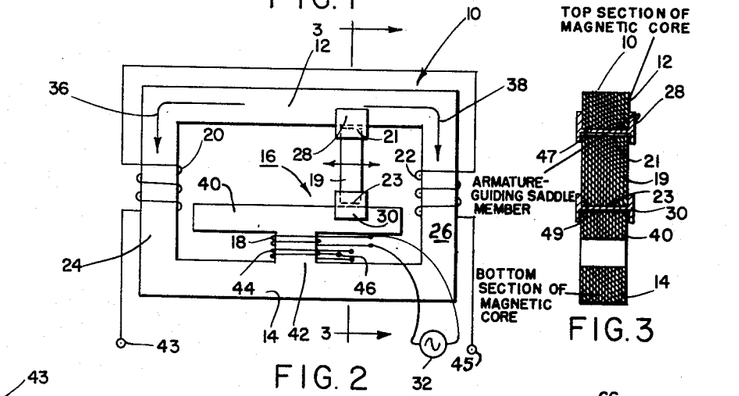
FIG. 2 is a simplified plan view of another embodiment of a linear transducer.
FIG. 3 is a section taken along line 3—3 of FIG. 2.

In FIG. 2 I have illustrated an embodiment of my invention in which the input coil is not required to move with the movable core 19. Instead of spanning the entire distance between the sections 12 and 14 of the continuous core 10, the core 19 rides between the section 12 and a pedestal 40, magnetically linked to the section 14 by a bridging section 42. The input coil 18 is wound around the section 42 and is therefore stationary.

Thus, in the embodiment of FIG. 2, the armature 16 includes the movable core 19 as in FIG. 1, as well as the stationary pedestal 40 and bridging section 42. Operation of the transducer is the same as in FIG. 1, except that the sensitivity is reduced by one half. This can be seen from the fact that when, as shown in FIG. 2, the core 19 is to the right of the zero position, the length of the flux path 36 varies according to displacement of the core, but the flux path 38 does not change. Any change in its length in the section 12 is offset by an opposing change in the pedestal 40. In any case, the output voltage of the transducer of FIG. 2 is a linear function of displacement of the core 19 within the limits set forth above. Thus, the voltmeter 34 may be connected between a pair of output terminals 43 and 45 to function in the same manner as in FIG. 1.

The manner in which the core 19 is mounted is shown in greater detail in FIG. 3. As shown therein, the saddle members 28 and 30 include webs 47 and 49 filling the gaps between the ends 21 and 23 of the movable core and the sections 12 and 14 of the core 10. Preferably, the saddle members are made of a somewhat resilient material having a low coefficient of friction and low magnetic permeability. For example, they might be of nylon. The cores 10 and 19 are preferably laminated in accordance with conventional magnetic circuit practice.

The coils 18, 20 and 22, which are wound around the respective portions of the transducer may be considered as coupled to these portions, inasmuch as the voltages across the coils and, in essence, related directly to the fluxes in these portions. As used herein in connection with the various coils, the term "coupled to" means a relationship of this type.

The term "lateral," as used herein, refers to elements, other than parts of the core 10, which extend across the closed magnetic circuit defined by the cores.

Figure 2A:
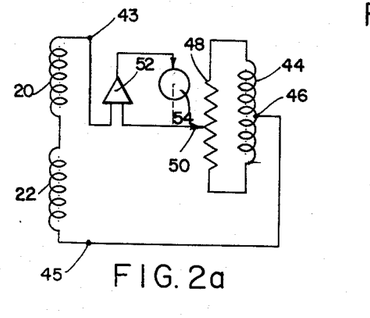
FIG. 2a is a schematic diagram of an electrical circuit which may be connected to any of my transducers to provide an instrument with highly linear characteristics.

The manner in which I have provided exact linearity of output over the full range of displacement of the movable core 19 will now be described in detail. As seen in FIG. 2, the transducer may be provided with a compensation winding 44 formed around the bridging section 42. As seen in FIG. 2a, the winding 44, which is provided with a center tap 46, is connected across a potentiometer 48 having a movable tap 50. The output terminal 45 of the series connected output coils 20 and 22 is connected to the center tap 46, and the input terminals of an amplifier 52 are connected to the terminal 43 and the potentiometer tap 50. The amplifier drives a servomotor 54, mechanically connected to the tap 50. Thus, the input voltage to the amplifier 52 is the difference between the transducer output voltage appearing between the terminals 43 and 45 and the voltage between the taps 46 and 50. The amplifier powers the servomotor 54, which moves the tap 50 in the proper direction to provide a zero input voltage to the amplifier, i.e., the transducer output voltage equals the voltage between the taps 46 and 50.

Assuming that the potentiometer 48 is linear, the voltage between the taps 40 and 46 is zero when the tap 50 is positioned midway along the potentiometer. This provides a null in the servosystem when the transducer output voltage is zero, which occurs when the movable core 19 (FIGS. 1 and 2) is at its zero position. On one side of the center position, the tap 50 has a polarity with respect to the tap 46, which is opposite the polarity that obtains on the other side of the center position. As pointed out above, the voltage between the terminals 43 and 45 undergoes a similar change upon movement of the movable core 19. That is, to a first approximation, the transducer output voltage is linearly related to displacement, with its phase depending upon the direction of displacement from the zero position. In other words, movement of the core 19 has the same effect on transducer output voltage as movement of the tap 50 has on the voltage between the taps 46 and 50. Accordingly, the position of the tap 50 along the potentiometer 48 is an exact indication of the position of the core 19, once the servosystem has provided a null at the input of the amplifier 52.

Should the total flux along the paths 36 and 38 (FIGS. 1 and 2) vary for any reason, there will, as pointed out above, be a proportionate variation in the voltages induced in the output coils 20 and 22. Thus, the output voltage between the terminals 43 and 45, which is the difference between the two induced voltages, will also vary in proportion to the change of total flux. However, the voltage induced in the compensation coil 44, which is linked by the total flux, is also proportional thereto. Thus, the position of the tap 50 of the potentiometer 48 at null is independent of the total flux. It is therefore an exact replica of the position of the core 19 out to the extreme limits of travel thereof. Other effects on total flux which are nullified by the compensation circuit of FIG. 2a are changes in the voltage from the source 32 (FIGS. 1 and 2) applied to the input coil 18 (FIGS. 1 and 2) and variations in the gaps between the core 19 and the core 10. Thus, the tolerances governing manufacture of the core 10 and pedestal 40 may be relaxed considerably, with a significant saving in cost of fabrication.

Figure 2B:
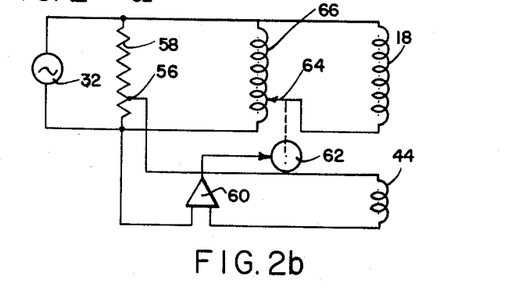
FIG. 2b is a schematic diagram of another circuit which may be used to linearize the characteristics of my transducers.

In FIG. 2b I have illustrated schematically a circuit which compensates for variations in total reluctance by maintaining a constant total flux in the transducer. This is accomplished by maintaining a constant ratio between the voltage induced in the coil 44 and the voltage of the source 32, which source should have a low impedance so as to provide a constant voltage across its terminals. More specifically, the voltage across the winding 44 is compared with the voltage between a tap 56 on a resistor 58 and one side of the line by applying the voltages in series between the input terminals of an amplifier 60. The output of the amplifier 60 is applied to a servomotor 62, mechanically coupled to the tap 64 of a variable autotransformer 66 controlling the voltage applied to the input coil 18 (FIGS. 1 and 2). The servomotor 62 adjusts the tap 64 to provide a null at the input of the amplifier 60, thereby maintaining the voltage induced in the coil 44 constant and ensuring a constant total flux in the transducer.

Figure 4:
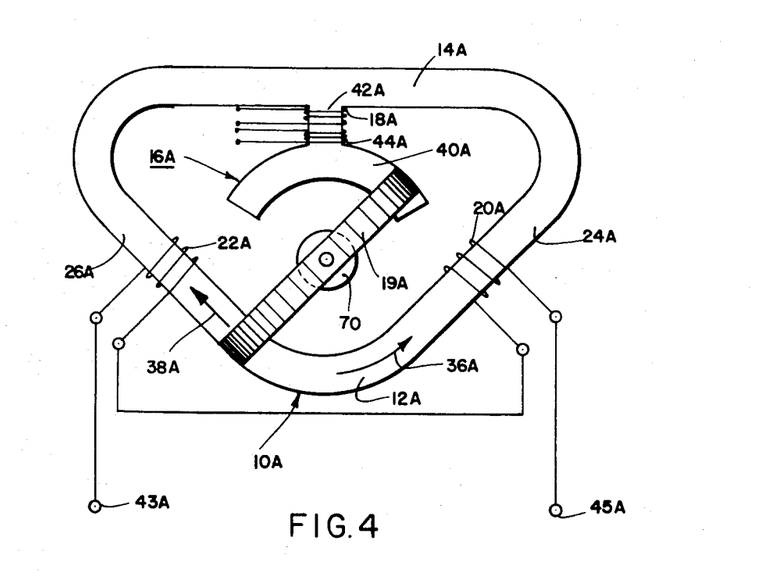
FIG. 4 is a plan view of a rotary transducer made according to my invention.
Figure 5:
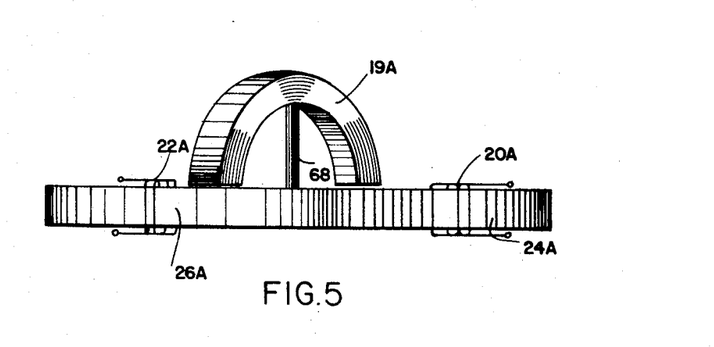
FIG. 5 is a side elevation, partly broken away, of the transducer of FIG. 4.

In FIGS. 4 and 5, I have illustrated a rotary version of my transducer. The various parts are analogous to the parts shown in FIGS. 1 and 2, and, therefore, the same reference numerals have been used, followed by the letter "a." The pedestal 40a and the section 12a of a continuous core 10a are curved, forming arcs of the same circle, and the movable core 19a is pivoted for rotation about the center of this circle. The core 19a is supported on a shaft 68 journalled in a bearing 70. The rotation of the core 19a varies the flux paths 36a and 38a in a manner similar to that of FIG. 2.

Figures 6, 7:
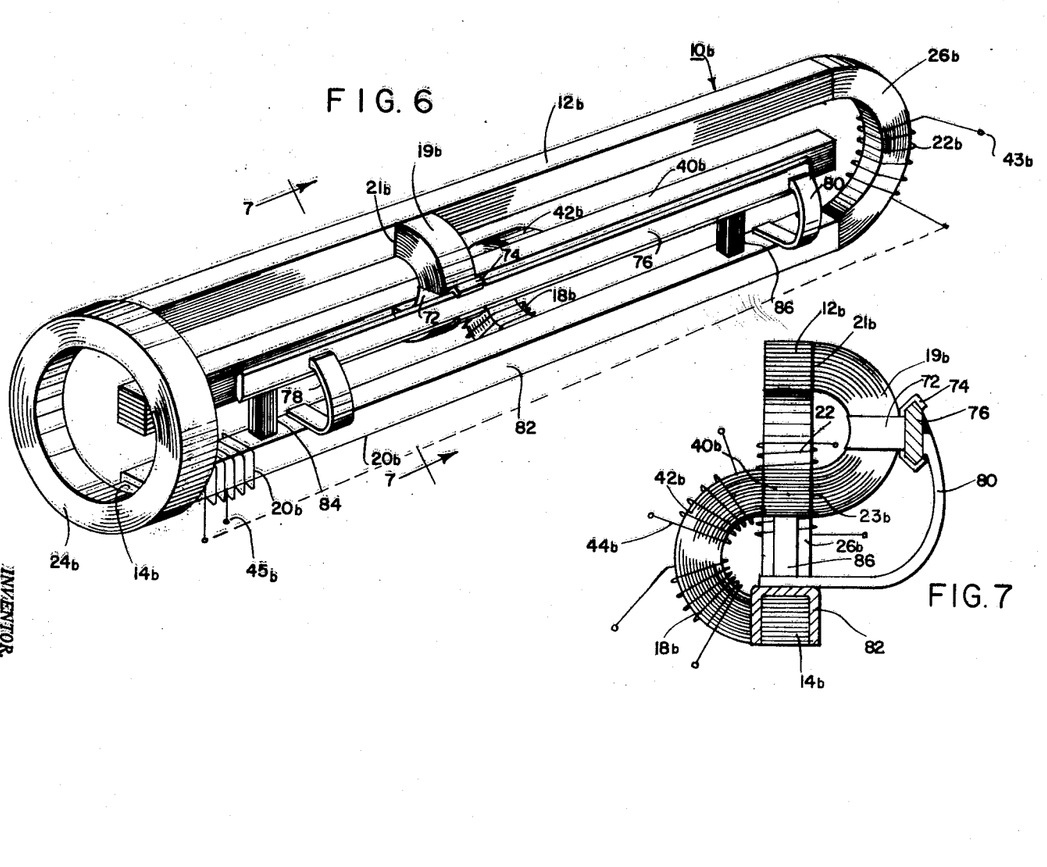
FIG. 6 is a perspective view of a linear transducer adapted for construction by means of magnetic foil.
FIG. 7 is a view, partly in section, taken along line 7—7 of FIG. 6.

FIGS. 6 and 7 depict a linear transducer whose design facilitates laminated construction using high permeability foil or tape. The reference numerals of FIGS. 1 and 2, with "b" added, have been used to denote analogous parts. In tape-wound construction, the various layers are bonded together by a thin film of a suitable cement. Therefore, it is preferable to pass the flux into and out of a member by way of the edges of the laminations to ensure full use of all the laminations. This is accomplished by forming the section 26b, the movable core 19b and the bridging section 42b as "C" cores in which the laminations are circumferentially disposed. The sections 12b and 14b are oriented with their laminations aligned with those of the section 26b. The laminations of the pedestal 40b are parallel to those of the sections 12b and 14b, and, thus, the laminations of the bridging section 42b abut those of both the pedestal 40b and the section 14b. The laminations of the movable core member 19b are similarly disposed with respect to those of the pedestal 40b and the section 12b. The section 24b has been shown as a complete circle, with circumferentially disposed laminations abutting those of the sections 12b and 14b. Either a full circle unit or a "C" core could be used for both of the sections 24b and 26b. The various permanently affixed members may be joined together by bonding or in any other convenient manner.

Still referring to FIGS. 6 and 7, the movable core 19b is mounted by means of a strap 72 on a slide 74 fitting over a guide member 76. The guide member 76, in turn, is supported by a pair of arms 78 and 80 fastened to a saddle member 82 fitted over the section 14b of the core 10b.

The parts supporting and guiding the movable core 19b should be non-magnetic. Preferably, the arms 78 and 80 provide a spring-like pressure urging the core 19b against the section 12b and pedestal 40b. The ends 21b and 23b of the core 19b may be provided with thin caps (not shown) of nylon or like material to maintain a high reluctance gap which aids in linearizing operation of the transducer in the manner described above. Suitable means (not shown) may be attached to the slide 74 to mechanically couple the core 19b to a movable object whose position is to be determined by means of the transducer.

It is noted that the output coil 20b is wound around the section 14b instead of the section 24b. The reason for this is that the circular section 24b provides parallel flux paths between the sections 12b and 14b, and, in order to register the total flux through these paths, I have disposed the coil 20b as shown. Additional support for the pedestal 40b may be provided by posts 84 and 86 bonded to the pedestal and the saddle member 82.

The entire continuous core 10b may be made in one piece by winding the magnetic tape around a suitable form. However, I prefer to use separate end sections 24b and 26b, which can be stocked in standard sizes and affixed to sections 12b and 14b cut-to-order for a given application.

Figure 8:
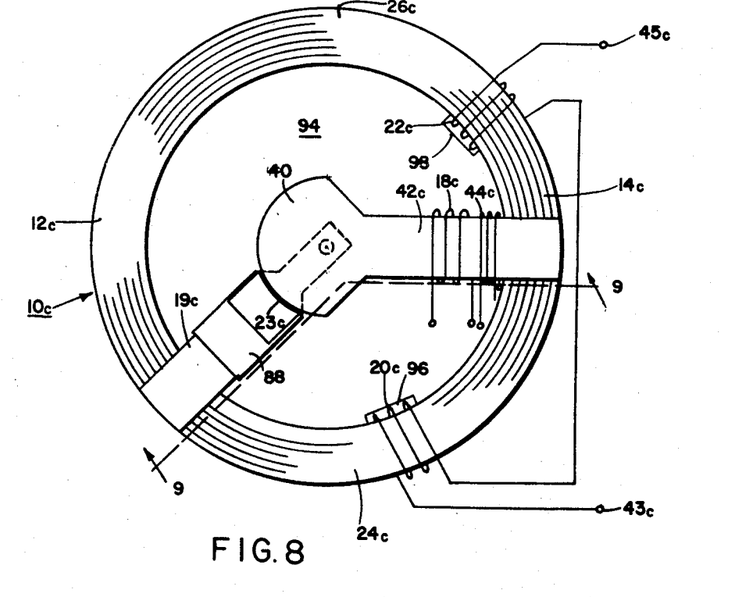
FIG. 8 is a top plan view of another rotary transducer embodying the principles of my invention.
Figure 9:
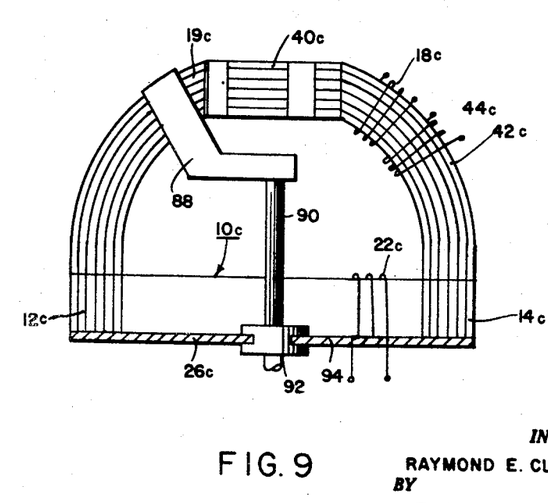
FIG. 9 is a side view, partly in section, taken along line 9—9 of FIG. 8.

In FIGS. 8 and 9 I have illustrated a rotary transducer particularly well adapted for laminated tape or foil construction. Again the reference numerals are the same as those used in FIGS. 1 and 2, with the letter "c" added in this case. The core 10c, which is circular, may be formed from a continuous spiral winding of tape, with the laminations parallel to the axis of the core. The bridging section 42c and pedestal 40c are integrally formed and secured to the section 14c of the core 10c by suitable bonding agents. Additional supports may be provided by struts (not shown) extending between the bridging section 42c and the core 10c. An arcuate movable core 19c is supported by an elbow member 88 mounted on a shaft 90. The shaft 90 is journalled in a bearing 92 affixed to a non-magnetic bottom plate 94 to which the core 10c is secured. The bottom plate 94 is cut away, as shown at 96 and 98, to provide room for the coils 20c and 22c.

The movable core 19c is generally arcuate in shape, so that its laminations may abut those of the core 10c and pedestal 40c. Furthermore, the end 23c of the movable core is preferably arcuately formed so as to conform to the curvature of the adjacent surface of the pedestal 40c.

Figure 10:
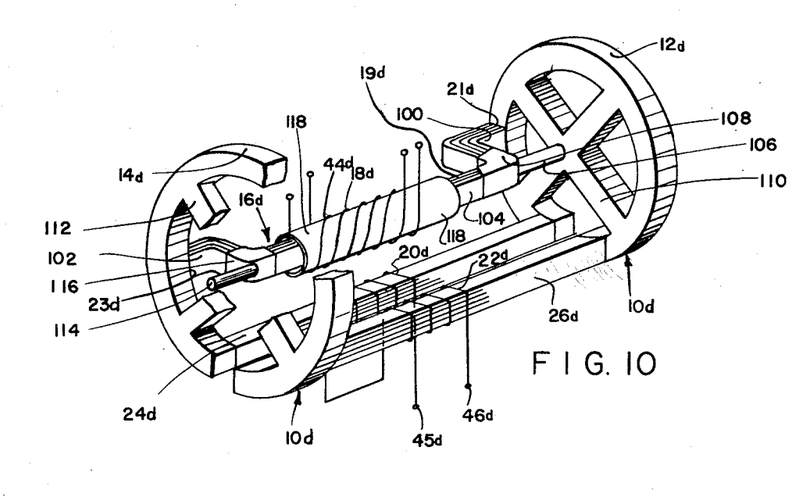
FIG. 10 is a simplified perspective view of still another embodiment of a rotary transducer made according to my invention.

FIG. 10 shows another rotary transducer which is, in essence, a curved version of the linear transducer of FIG. 1. The reference numerals of FIG. 1 have been used on corresponding parts in FIG. 10, with the letter "d" added. Thus, the sections 12d and 14d of the core 10d are formed into almost complete circles joined by sections 24d and 26d. The movable core 19d has end sections 100 and 102 and an intermediate section 104. Preferably, the section 104 is aligned with the axes of the circles defined by the sections 14d and 12d. A shaft 106, affixed to the section 104 by means of a strap 108, is journalled in a non-magnetic spider support 110 affixed to the section 12d of the core 10d. Similarly, at the other end of the transducer, a spider support 112, affixed to the core section 14d, journals a shaft 114 connected to the section 104 of the movable core by means of a strap 116.

Still referring to FIG. 10, the input coil 18d is wound on a tubular form 118, as is a compensation coil 44d. The form 118 is rotatably mounted on the intermediate section 104, and the axial alignment of the section 104 with the axis of rotation thus permits rotation of the armature 16d without movement of the form 118 and the coil wound thereon.

It will be apparent that the operation of the rotational transducer of FIG. 10 is exactly the same as that of the linear transducer of FIG. 1, with the exception that the translational movement of the ends 21d and 23d of the core 19d describes a circle rather than a straight line. This arrangement permits measurement of angles over the range of almost a full circle. Moreover, the output voltage is a linear function of the angle rather than some other function such as sine or cosine. It is noted that this voltage-angle relationship is also obtained with the other rotational transducers described above.

A rotational transducer of the type shown in FIG. 10 may, of course, be derived directly from FIG. 2 instead of FIG. 1, in which case a pedestal 40d connected to the section 14d by a bridging section 42d would engage the end 23d of the core 19d. Furthermore, the transducers of FIGS. 1 and 2 may be formed into shapes other than circular. In fact, they may be used to measure displacement along any contour by forming the sections 12 and 14 of the continuous core 10 to follow the contour. It should also be noted that the transducer of FIG. 10 may be modified to measure rotation of more than 360 degrees. This can be accomplished by forming the curved sections 12d and 14d as multiple turn helices. The movable core member 19d would then be shaped so that the ends 21d and 23d thereof would contact the outer peripheries of the sections 12d and 14d. If a laminated tape or foil construction is used, the disposition of the laminations would, of course, be somewhat different than that shown in FIG. 10.

Another method of accomplishing multiple turn rotational measurement is to form a unit which is similar to that of either FIG. 1 or FIG. 2, twisted about an axis parallel to and midway between the sections 12 and 14 of the core 10. The cores 10 and 12 would thus again be helices, but, in this case, the two helices would be intertwined.

Figure 11:
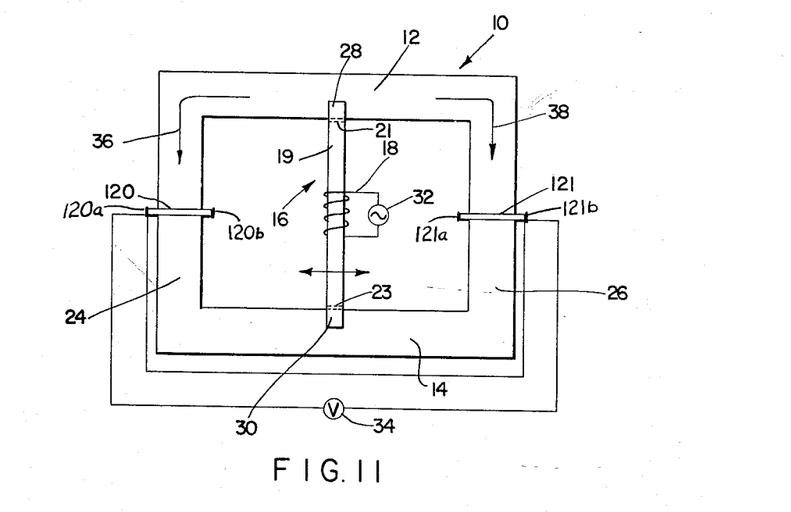
FIG. 11 is a simplified plan view of a transducer using Hall effect devices as magnetic field sensors.

FIG. 11 illustrates a modification of the transducers of FIGS. 1–9 in which the magnetic field sensors 120 and 121 are Hall effect devices. These sensors are used in place of the secondary coils 20 and 22, 20a and 22a, 20b and 22b, etc. Each Hall effect device comprises a thin wafer of semiconductor material inserted in the loop 10. Thus, the magnetic flux in the path 36 passes through the semiconductor wafer incorporated in the sensor 120, and the flux in the path 38 passes through the wafer in the sensor 121.

An electric accelerating field is applied to each wafer in one direction perpendicular to the magnetic field, e.g., perpendicular to the plane of the drawing. This electric field accelerates charge carriers in the wafer in a direction parallel to the field. Whenever a magnetic field passes through the wafer, the charge carriers are diverted in a direction perpendicular to both the magnetic field and the electric field, i.e., to the right or left in FIG. 11. Some of the carriers reach electrodes 120a–120b and 121a–121b, resulting in output potentials at these electrodes. In each case, the output potential depends on the strength of the magnetic field.

The output potentials of the sensors 120 and 121 are subtracted as before to provide a net output voltage for the meter 34.

It will be appreciated that, since the sensors 120 and 121 are sensitive to both steady and alternating magnetic fields, the source 32 can be either an alternating- or direct-current source in FIG. 11. If the source provides direct current and the accelerating fields in the sensors are direct, the output voltages of the sensors will also be direct. If either the current from the source 32 or the accelerating fields in the sensors 120 and 121 are alternating, the output potentials of the sensors will be alternating.

The various circuits described above illustrate the use of my invention as a position indicator, with a visible output provided by the voltmeter 34 or, as in FIG. 2a, the position of the tap 50 of the potentiometer 48. The arrangement of FIG. 2a also may be thought of as a servo positioning system in which the tap 50 and an object linked thereto are positioned in accordance with the location of the armature of one of my transducers. In accordance with conventional practice, the positioning system may also have the motor 54 coupled to the transducer armature instead of the tap 50. The position of the tap will then be the input to the system.

Furthermore, a positioning system may use my transducers as both input element and position indicator. In such case, the input signal is in the form of the position of one of the armatures. The other armature is connected to the object to be positioned, and a servomotor moves the object to provide a null between the output voltages of the two transducers.

In this connection it is noted that the transducers embodying my invention may be run "backwards" in the manner of prior magnetic transducers. That is, the supply current may be fed to the "stator" windings 20 and 22 and an output voltage taken from the "armature" winding 18. In order for the output voltage to undergo a null and phase reversal at the center position, the coils 20 and 22 must develop fluxes in a "series aiding" relationship around the core 10. The positioning system will then compare the output voltages developed by the coils 18 in the input element and the position indicator. This arrangement is, in general, not as desirable as the preferred system using the coil 18 for the input current; when the coils 20 and 22 develop the input flux, the core 10 provides a low impedance path, so that a relatively small amount of flux passes through the high impedance path extending through the coil 18 and at the air gaps at the end of the armature 16.

It will be noted that, regardless of the use to which one of the transducers is put, there is an output device responsive to the output voltage of the transducer.

While the coils 18 have been shown as single units wound directly around the armatures, it is of course possible to use equivalent split coils in accordance with well-known magnetic and electrical techniques. Thus, in FIG. 1, for example, the coil 18 might be replaced by two units (not shown) adjacent to the coils 20 and 22. These two units are preferably connected in series to the source 32, and they are wound so as to generate flux in series opposition around the core 10. Thus, they have exactly the same effect as the single unit coil 18 illustrated in the various figures of the drawings. Accordingly, the mention of a coil coupled to the armature, in the specification and in the claims, includes a two unit coil.

From the above, it will be apparent that I have provided an instrument which is capable of high accuracy in the measurement of linear or radial displacement, yet requiring minimum use of expensive fabrication techniques. Furthermore, the accuracy is obtainable over a wide range of displacement in both the linear and rotational versions. The instrument may be constructed to include the compensating circuits described above, which may be connected to any of the described transducers to enhance the linearity of the output voltage-displacement characteristics thereof.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is a continuation-in-part of my co-pending application Serial No. 75,215, filed December 12, 1960, now abandoned.

I claim:
1. A position transducer comprising
   (a) a closed magnetic circuit defined by a structure comprised of high magnetic permeability material,
   (b) a lateral magnetic circuit means extending from said closed circuit at a first portion thereof,
   (c) first and second coils coupled to said closed circuit, one on each side of said first portion, whereby the entire lateral magnetic circuit means along said closed circuit is between the ends of said coils enclosing said first portion,
   (d) a coil coupled to said lateral circuit means,
   (e) a second portion of said closed circuit between said first and second coils and opposite said first portion,
   (f) said second portion having a high permeability and having a reluctance along its length which is a predetermined function of distance therealong,
   (g) low magnetic reluctance means bridging between said lateral circuit means and said second portion, thereby to form first and second flux paths in said closed magnetic circuit and between said bridging means and said lateral circuit means, a first one of said paths being coupled to said first coil and the second path being coupled to said second coil,
   (h) a first end of said magnetic bridging means adjacent said second portion being movable relative thereto, thereby to vary the relative reluctance of said first path with respect to that of said second path, said variation in reluctance being due substantially solely to a change in the relative reluctances of the parts of the high permeability parts of said structure in the respective paths.
2. The combination defined in claim 1 including means mounting said bridging means so that the magnetic gaps between said bridging means and said closed circuit and lateral circuit means are substantially constant over the range of travel of said first end.
3. The combination defined in claim 1 in which said lateral circuit means includes a first surface extending in substantially the same direction as a second surface of said second portion of said closed circuit, and including means mounting said bridging means for simultaneous movement of the ends thereof along said first and second surfaces.
4. The combination defined in claim 1 in which said bridging means is pivoted for rotation of said first end about an axis of rotation, said second portion of said closed magnetic circuit being arcuate, with its center of curvature at said axis of rotation.
5. The combination defined in claim 1 in which said first end of said bridging means is movable along said second portion, thereby changing the relative lengths of said first and second paths.
6. The combination defined in claim 1 including means supporting said bridging means and said second portion in such manner that said relative movement thereof changes the relative lengths of said flux paths.
7. A position transducer comprising
   (a) a closed magnetic circuit defined by a structure comprised of high magnetic permeability material,
   (b) lateral magnetic circuit means extending from said closed circuit at a first portion thereof,
   (c) first and second coils coupled to said closed circuit, one on each side of said first portion, whereby the entire lateral magnetic circuit means is between said coils along said first portion of said closed circuit,
   (d) a third coil coupled to said lateral circuit means,
   (e) a second portion of said closed circuit being between said first and second coils and opposite said first portion having a high permeability and having a reluctance which is a predetermined function of distance therealong,
   (f) said lateral circuit means bridging between said first and second portions, whereby if a magnetic flux is developed in said lateral circuit means it divides into a first path in said closed circuit extending through said first coil and a second path in said closed circuit extending through said second coil,
   (g) the end of said lateral circuit means adjacent said second portion being movable relative thereto in such manner as to vary the reluctance of said first path relative to that of said second path, said reluctance variation being due substantially solely to changes in the relative reluctances of the parts of said structure in said first and second flux paths.
8. The combination defined in claim 7 including
   (a) a first coil unit comprising said first and second coils,
   (b) a second coil unit comprising said third coil,
   (c) means for passing a current through one of said coil units, and
   (d) means responsive to the voltage induced by said current in the other of said coil units.
9. The combination defined in claim 7 including
   (a) means for supplying current to said third coil,
   (b) means for controlling said current to maintain the flux in said lateral circuit means constant over the range of travel of said first end,
   (c) indicating means responsive to the difference in the voltages induced in said first and second coils by said flux.
10. The combination defined in claim 7 in which
   (a) said second portion of said closed circuit is arcuate, and
   (b) including means mounting said lateral circuit means for rotation of said first end about the axis of said second portion.
11. The combination defined in claim 10 in which
   (a) said first portion of said lateral circuit means is also arcuate and coaxial with said second portion,
   (b) said lateral circuit means has a second end adjacent to said first portion,
   (c) said ends of said lateral circuit means moving along said first and second portions of said closed circuit upon rotation about said axis.

12. The combination defined in claim 7 in which
(a) said lateral circuit means includes a fixed member and a movable member,
(b) said fixed member has
(1) a second end secured to said first portion of said closed circuit and
(2) pivot means carrying said movable member for rotation thereabout,
(c) said first end of said lateral circuit means being on said movable member and spaced from said pivot means.

13. The combination defined in claim 7 in which said end of said lateral circuit means is movable along said second portion, thereby changing the relative lengths of said first and second paths.

14. The combination defined in claim 7 including means supporting said lateral circuit means and said second portion in such manner that said relative movement thereof changes the relative lengths of said flux paths.

15. A position transducer comprising
(a) a closed magnetic circuit defined by a structure comprised of high magnetic permeability material,
(b) a lateral magnetic circuit means extending from said closed circuit at a first portion thereof,
(c) first and second coils coupled to said closed circuit, one on each side of said first portion,
(d) a third coil coupled to said lateral circuit means,
(e) a second portion of said closed circuit being of high permeability material and being between and defined by said first and second coils and opposite said first portion,
(f) magnetic means coupling said lateral circuit means and said second portion, whereby if a flux is developed in said lateral circuit means, it divides into first and second flux paths in said closed magnetic circuit, said first path being coupled to said first coil and said second path being coupled to said second coil,
(g) a first end of said magnetic means being adjacent said second portion and movable relative thereto in such manner as to change the reluctance of one of said flux paths relative to the reluctance of the other of said flux paths, said change in reluctance being due substantially solely to a change in the relative lengths of the parts of the respective paths comprising said high permeability material,
(h) said magnetic means being the sole lateral low reluctance member coupling said first and second portions.

16. The combination defined in claim 15 in which
(a) said second portion of said closed circuit and said lateral circuit means have surfaces defined by parallel lines,
(b) said magnetic coupling means has a second end adjacent said lateral circuit means, and
(c) said transducer includes means for moving the ends of said magnetic means along said surfaces.

17. The combination defined in claim 15 in which
(a) said second portion of said closed circuit and said lateral circuit means have arcuate surfaces with the same center,
(b) said magnetic coupling means has a second end adjacent said lateral circuit means, and
(c) said magnetic means is pivoted for rotation about said center, with the ends of said magnetic means adjacent said arcuate surfaces.

18. The combination defined in claim 15 in which
(a) said second portion of said closed circuit is arcuate,
(b) the concave side of the arc faces said lateral circuit means, and
(c) said magnetic coupling means is pivoted for rotation with said first end thereof moving along said arcuate second portion.

19. The combination defined in claim 15 including
(a) means for supplying current to said third coil, and
(b) output means responsive to the difference in the voltages developed in said first and second coils as a result of said current.

20. The combination defined in claim 19 including means for maintaining the flux in said magnetic coupling means constant over the range of movement thereof.

21. The combination defined in claim 19 including
(a) further means developing a compensation voltage proportional to the total flux developed by current in said third coil, and
(b) output means for comparing said compensation voltage with the difference between the voltages induced in said pair of coils.

22. A position transducer comprising
(a) a closed magnetic circuit defined by a structure comprised of high magnetic permeability material,
(b) lateral magnetic circuit means extending from said closed circuit at a first portion thereof,
(c) a coil coupled to said lateral circuit means,
(d) first and second flux sensing units magnetically coupled to said closed circuit, one on each side of said first portion, whereby the entire lateral magnetic circuit means is between said sensing units along said first portion of said closed circuit,
(e) a second portion of said closed circuit having a high permeability and being between said first and second sensing units and opposite said first portion, said second portion having a reluctance which is a predetermined function of distance therealong,
(f) said lateral circuit means bridging between said first and second portions, whereby magnetic flux developed in said lateral circuit means by said coil divides into two paths in said closed circuit, a first one of said circuit paths extending through said first sensing unit and the second path extending through said second sensing unit,
(g) the end of said lateral circuit means adjacent said second portion being movable relative thereto, thereby to change the reluctance of said first path relative to that of said second path, said reluctance change being due substantially solely to a change in the relative reluctance of the parts of said structure in said first and second flux paths.

23. The combination defined in claim 22 in which said end of said lateral circuit means is movable along said second portion, thereby changing the relative lengths of said first and second paths.

24. The combination defined in claim 22 including means supporting said lateral circuit means and said second portion in such manner that said relative movement thereof changes the relative lengths of said flux paths.

25. The combination defined in claim 22 in which said flux sensing units are Hall effect devices.

26. A position transducer comprising
(a) a closed magnetic circuit defined by a structure comprised of high magnetic permeability material,
(b) a lateral magnetic circuit means extending from said closed circuit at a first portion thereof,
(c) first and second magnetic flux sensing means magnetically coupled to said closed circuit, at points bracketing said first portion, whereby the entire lateral magnetic circuit means along said closed circuit is between ends of said sensing units,
(d) a coil coupled to said lateral circuit means,
(e) a second portion of said closed circuit having a high permeability and having between ends of said first and second sensing units and opposite said first portion,
(f) said second portion having a reluctance along its length which is a predetermined function of distance therealong,
(g) low magnetic reluctance means bridging between said lateral circuit means and said second portion, whereby if a flux is developed in said lateral circuit means by said coil it divides into two paths in said closed magnetic circuit, a first one of said paths extending through said first flux sensing means and the second path extending through said second flux sensing means, (h) a first end of said magnetic bridging means adjacent said second portion being movable relative thereto, thereby to change the reluctance of said flux paths relative to each other, said change in relative reluctance being due substantially solely to a change in the relative reluctance of the parts of said structure in the respective flux paths.

27. The combination defined in claim 26 in which said first end of said bridging means is movable along said second portion, thereby changing the relative lengths of said first and second paths.

28. The combination defined in claim 26 including means supporting said bridging means and said second portion in such manner that said relative movement thereof changes the relative lengths of said flux paths.

29. The combination defined in claim 26 in which said flux sensing means are Hall effect devices.

References Cited by the Examiner
UNITED STATES PATENTS

| | | | |
|---|---|---|---|
| 1,798,592 | 3/31 | Davis | 340—199 |
| 2,692,357 | 10/54 | Nilson | 340—199 |

FOREIGN PATENTS

| | | |
|---|---|---|
| 555,042 | 7/32 | Germany. |

NEIL C. READ, *Primary Examiner.*
THOMAS B. HABECKER, *Examiner.*

UNITED STATES PATENT OFFICE
CERTIFICATE OF CORRECTION

Patent No. 3,178,696                                        April 13, 1965

Raymond E. Claflin, Jr.

It is hereby certified that error appears in the above numbered patent requiring correction and that the said Letters Patent should read as corrected below.

Column 8, line 66, strike out "at", first occurrence; column 12, line 69, for "having" read -- being --.

Signed and sealed this 28th day of September 1965.

(SEAL)
Attest:

ERNEST W. SWIDER                                        EDWARD J. BRENNER
Attesting Officer                                            Commissioner of Patents